US010634114B1

(12) United States Patent
Kovrlija

(10) Patent No.: US 10,634,114 B1
(45) Date of Patent: Apr. 28, 2020

(54) MULTIVANE HYDROKINETIC TURBINE

(71) Applicant: Djuro Kovrlija, Natick, MA (US)

(72) Inventor: Djuro Kovrlija, Natick, MA (US)

( * ) Notice: Subject to any disclaimer, the term of this patent is extended or adjusted under 35 U.S.C. 154(b) by 0 days.

(21) Appl. No.: 16/247,065

(22) Filed: Jan. 14, 2019

(51) Int. Cl.
*F03B 17/06* (2006.01)
(52) U.S. Cl.
CPC ........ *F03B 17/065* (2013.01); *F05B 2220/32* (2013.01); *F05B 2240/244* (2013.01); *F05B 2240/311* (2013.01)
(58) Field of Classification Search
CPC .... F03B 17/062; F03B 17/065; F03B 17/066; F03B 17/067; F03B 17/068; F03B 3/145; F05B 2240/311
See application file for complete search history.

(56) References Cited

U.S. PATENT DOCUMENTS

| 3,382,931 | A | * | 5/1968 | Dejussieu-Pontcarral ................... F03B 17/067 416/113 |
| 5,324,164 | A | * | 6/1994 | Doering ................ F03B 17/067 415/150 |
| 2009/0016884 | A1 | * | 1/2009 | Yan .......................... F03D 3/067 416/147 |
| 2013/0034440 | A1 | * | 2/2013 | Sobocinski ........... F03B 17/065 416/13 |
| 2014/0178177 | A1 | * | 6/2014 | Zhang ................... F03B 17/063 415/60 |
| 2015/0078897 | A1 | * | 3/2015 | Min ........................ F03D 3/068 416/10 |
| 2017/0314528 | A1 | * | 11/2017 | McCormack ......... F03B 13/264 |

FOREIGN PATENT DOCUMENTS

| GB | 2495443 A | * | 4/2013 | ............ F03B 11/006 |
| WO | WO-2011113424 A2 | * | 9/2011 | ............... F01D 5/12 |

OTHER PUBLICATIONS

WO-2011113424-A2 MachineTranslation, Received Aug. 2019.*

* cited by examiner

*Primary Examiner* — Moshe Wilensky
*Assistant Examiner* — Elton K Wong
(74) *Attorney, Agent, or Firm* — Sunstein LLP

(57) ABSTRACT

A hydrokinetic turbine has upper and lower vane mounts; a main shaft coupling the vane mounts to form an assembly mounted for rotation about a central axis; a set of vanes, each vane mounted between the upper and lower vane mounts for reciprocating rotation about its respective longitudinal axis; a vane angle control mechanism, configured to control angle of the vanes relative to the direction of current so as to provide an angle of attack, relative to the direction of the current, that is cyclically adjusted over the course of rotation of the shaft. A given vane is oriented: (i) substantially transversely to the direction of the current when the assembly's orientation causes the vane to be in a driving mode, and (ii) substantially parallel to the direction of the current when the assembly's orientation causes the vane to be in a driven mode.

16 Claims, 8 Drawing Sheets

Rev.2

Fig. 2. Rev. 1.

Rev.2

Rev. 1.

Rev. 1.

MULTIVANE HYDROKINETIC TURBINE

TECHNICAL FIELD

The present invention relates to devices for generating hydroelectric power, and more particularly to vane-operated turbines.

BACKGROUND ART

Traditional hydropower plants require the installation of a dam which in turn requires a landscape suitable to massive engineering works and causes a huge environmental impact. On the other hand, wind turbines typically generate only about one fifth of the energy they are rated at due to the intermittent nature of wind power. Moreover, water has much more specific mass than air. The amount of kinetic energy that passes through a turbine is:

$$K_e = \frac{1}{2} \times M \times V^2$$

where M is the mass of the water flowing through the turbine and V is its velocity. A unit of volume of water weighs about 854 times as the same volume of air at sea level, so a water turbine can yield much more energy than a wind turbine of the same size. Unfortunately, the construction costs and environmental drawbacks associated with the building of a dam often render hydropower an unattractive proposition.

SUMMARY OF THE EMBODIMENTS

In accordance with an embodiment of the invention, there is provided a hydrokinetic turbine, operative in a water environment and driven by a water current. The turbine of this embodiment includes upper and lower vane mounts; a main shaft coupling the vane mounts to form an assembly and defining a central axis; the assembly being mounted for rotation about the central axis. The main shaft provides a rotational output. The embodiment further includes a set of at least three vanes, each vane having a longitudinal axis and mounted between the upper and lower vane mounts for reciprocating rotation about its respective longitudinal axis. The vanes have a drive mode when, in the course of rotation of the main shaft, in a first rotational segment, water current causes the vanes to drive the main shaft and, in a second rotational segment, water current causes the vanes to be driven by the main shaft. The embodiment further includes a vane angle control mechanism, configured to control angle of the vanes relative to the direction of current so as to provide an angle of attack, relative to the direction of the current that is cyclically adjusted over the course of rotation of the shaft. In this embodiment, the vane control mechanism operates so that a given vane is oriented: (i) substantially transversely to the direction of the current when the assembly's orientation causes the given vane to be in a driving mode, to power rotation of the assembly over the first angular rotational segment of the assembly, (ii) substantially parallel to the direction of the current when the assembly's orientation causes the given vane to be in a driven mode over the second angular rotational segment, to return the given vane to a rotational position at a beginning of the first angular rotational segment. In a further related embodiment, the vane control mechanism further operates so that angle of attack is adjusted to compensate for current velocity changes experienced by the given vane over the course of the driving mode.

In a further related embodiment, the vane angle control mechanism includes: a set of control cam segments mounted in a location selected from the group consisting of above the upper vane mount and below the lower vane mount, each cam segment forming a curved cam groove; and a set of guide wheels, each guide wheel associated with a distinct one of the vanes and mounted so that a center of the guide wheel coincides with the longitudinal axis of the corresponding vane, each guide wheel including a set of follower rollers disposed over a rotational extent of at least about 45 degrees around such guide wheel and engageable with a corresponding one of the grooves, depending on an angular position of the assembly.

In another related embodiment, each vane is of resilient material having a surface configured to be deflected, by water current in a direction that is transverse to the vane, into a shape that provides hydrodynamic lift in the presence of such current. Optionally, each vane comprises a double-flexible wall assembly, having opposed faces and configured to form a concave surface on a working face that is first impinged by the water current and a convex surface on the opposed face, so as to generate a hydrodynamic lift. In a further related embodiment, each vane includes a single flexible wall configured to form a surface having a plurality of concavities. Optionally, there is provided at least one stationary cam segment in one of the grooves, the stationer cam segment being configured to keep a fixed angle of attack of the water flow on the vane along the length of the groove. As a further option, at least one of the grooves is formed in a cam segment having an adjustable orientation. In that context, in a related embodiment, the adjustable orientation is adjustable by pivoting the cam segment about a pivot point. Optionally, there is provided a linear actuator, coupled to the pivotable cam segment, and configured move the cam segment about the pivot point. In another related embodiment, one of the grooves is configured to render the orientation of the vane substantially parallel to the direction of the current over the second angular rotational segment.

In another related embodiment, there is provided a vane rotator configured to change the orientation of the vane from a first angle of attack of the water flow on the vane to a second angle of attack of the water flow on the vane. Optionally, each guide wheel includes a sprocket segment and the vane rotator is a roller rack configured to engage the sprocket segment and change the orientation of the vane from the first angle of attack to the second angle of attack. Optionally, the vane rotator is configured to preserve the direction of the torque generated by the vane about the central axis.

In a related embodiment, there is provided a hydrokinetic turbine system comprising a pair of turbines, each turbine being constructed according to one of the previously described turbine embodiments, wherein the pair of turbines are mechanically coupled so as to engage in synchronized counter rotation. Optionally, the system further includes a water current splitter disposed between the turbines. As a further option, the current splitter is a V-shaped column.

In another related embodiment, the turbine includes an adjustable water intake. Optionally, the adjustable water intake is a gate configured to reduce the water current in the event of an emergency.

In another related embodiment, the turbine includes a security device configured to orient all vanes parallel to the direction of the current.

In another related embodiment, the turbine includes a gearbox coupling the main shaft to an electrical power generator.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

A "vane" is member, of a hydrokinetic power plant, that, when placed in a flow of water, converts the flow of water, against a face of the vane on its working side, to rotational power. A vane, in accordance with embodiments of the present invention, is mounted for rotation about a vertical axis for purposes of adjusting its angle of attack relative to the direction of water flow. The angle of attack is zero degrees when the direction of water flow is parallel to the face of the vane on its working side.

Unless otherwise specified, the "angle of attack" of a water flow on a vane is measured at the center of the working side of the vane.

A vane is oriented to be "substantially transverse" to the direction of water flow when the vane has an orientation in which the direction of water flow is less than about 45 degrees of a normal to the face of the vane on its working side, such that the water flow in respect to the vane applies a force that is used to perform work by the turbine while the vane is in a driving mode to the vane.

A vane is oriented to be as "substantially parallel" to the direction of water flow when the vane has an orientation in which the direction of water flow is greater than about 45 degrees of a normal to the face of the vane on its working side, such that a force applied to the vane by the water flow in minimized, a condition under which the vane is in a driven mode under which it is returned to an initial position from which it can again perform work for the turbine.

Various elements may be described or claimed as "configured to" perform a task or tasks. In such contexts, "configured to" is used to connote structure by indicating that the element includes structure (e.g., mechanical parts) that performs the task or tasks during operation. As such, the element can be said to be configured to perform the task even when the specified element is not then currently operational (e.g., is not in motion). An element used with the "configured to" language may include hardware, for example, mechanical parts, memory storing program instructions executable to implement the operation, etc. reciting that the element is "configured to" perform one or more tasks is expressly intended not to invoke 35 U.S.C. § 112(f) for that element.

Multivane Hydrokinetic Turbine

Figure 1:
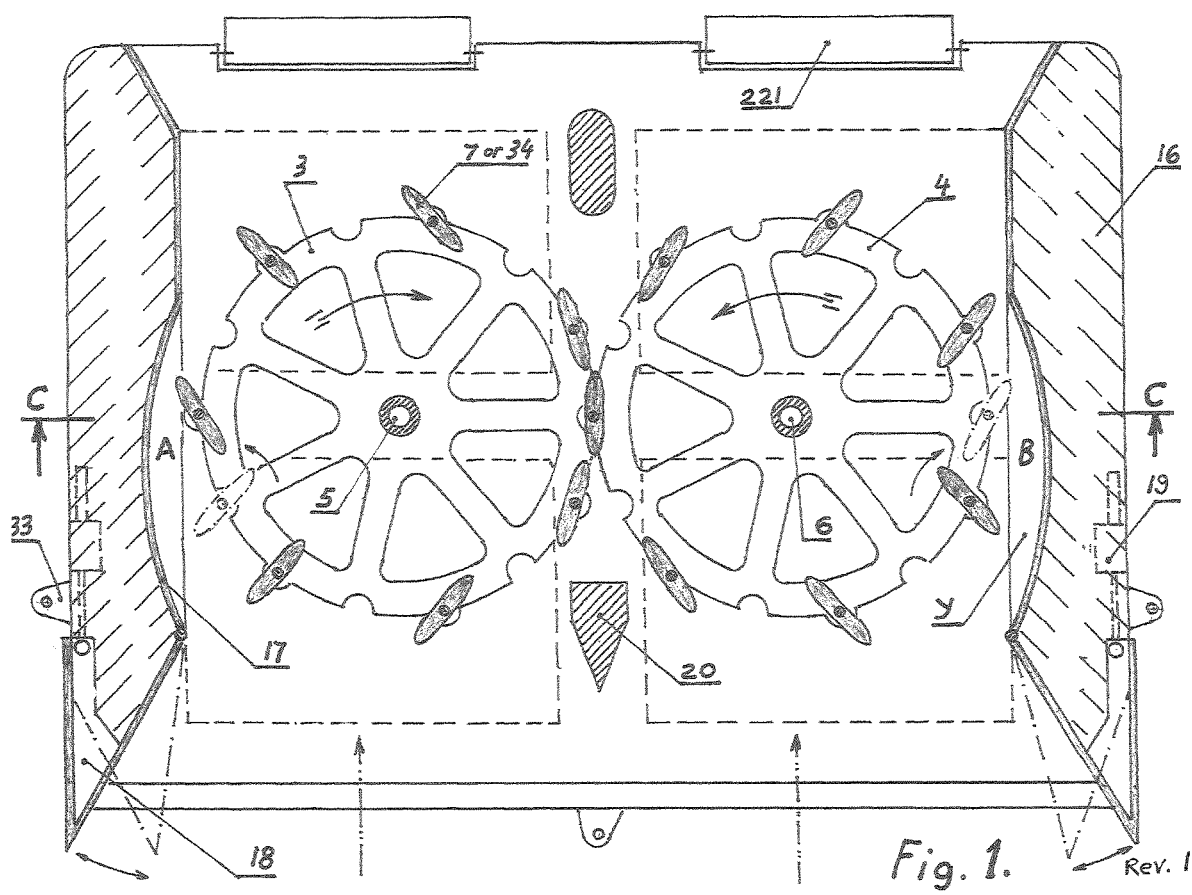
FIG. 1 is a plan view of a hydrokinetic power plant assembly featuring twin turbine wheels and a floating support barge, in accordance with an embodiment of the present invention.

In a first aspect, the present application provides an improved hydrokinetic (water-powered) power plant that can generate electricity from the kinetic energy contained in bodies of moving water, including streams, rivers, and tidal ocean currents. The power plant requires no dams or other type of engineering structures for channeling the water into the turbine. FIG. 1 is a plan view of a hydrokinetic power plant assembly featuring twin turbine wheels 3 and 4, in accordance with an embodiment of the present invention. The view is a cross-section through plane B-B of FIG. 2. The turbine shafts are oriented vertically, resulting in a compact layout and keeping the electric generator, gear box, and control panels above the water line and easy to access for maintenance and inspection. The power plant design provided herein is suitable for generating power in rivers because it can operate in bodies of water as shallow as about 3 m (10 ft).

In one embodiment, the base of the power plant is installed at the bottom of a river or other watercourse while the mechanical room is located above water level. If the water depth is more than about 6 m (20 ft), the power plant may use water turbines fitted with extended vertical shafts to keep mechanical and electrical equipment above the water line. In locations where the difference between high- and low-tide water levels is large enough, the power plant can be used to harvest the energy associated with tidal water currents. To this end, a bridge structure may be used to house one or several power plant systems. The turbines may be installed under water while the mechanical room may be located above the bridge and connected with the turbines through extended vertical shafts. The turbines would operate in reverse mode when tide is going out.

The two hydrokinetic turbine wheels 3 and 4 of FIG. 1 rotate synchronously in opposite directions. In this embodiment, each of the turbine wheels 3 and 4 includes a set of seven vanes 7, although other numbers of vanes are within the scope of the invention. The turbine wheels 3 and 4 are enclosed in rectangular duct 17 to ensure that water flowing through the turbine has maximum interaction with all the vane surfaces. A bypass Y prevents the vanes located upstream of the main axes 5 and 6 from reducing flow through the section of the turbine downstream of the main axes 5 and 6. Floating supporting barge structure 16 provides a sufficiently rigid structure connecting the parts of the power plant so that it can operate at different working conditions and can be secured with anchor ropes attached to lugs 33. The supporting barge structure also provides flexibility for power plant installation in different sites and conditions. Horizontal tail fins 221 help to stabilize the power plant in instances where the barge is floating.

The velocity of the water flowing into the turbine duct 17 can be controlled with a pair of symmetrically disposed adjustable gates 18, each gate operated by a hydraulic linear actuator 19. (A gate-actuator pair is on each side, although only one gate and one actuator are labeled in the drawing.) A V-shaped column 20 located upstream of the turbine wheels splits water flow between the two turbines and creates a vortex behind the column. The negative pressure resulting from the vortex increases turbine efficiency because it acts on the vanes from both turbines as they are moving against the direction of the water current, thereby lowering drag.

Figure 2:
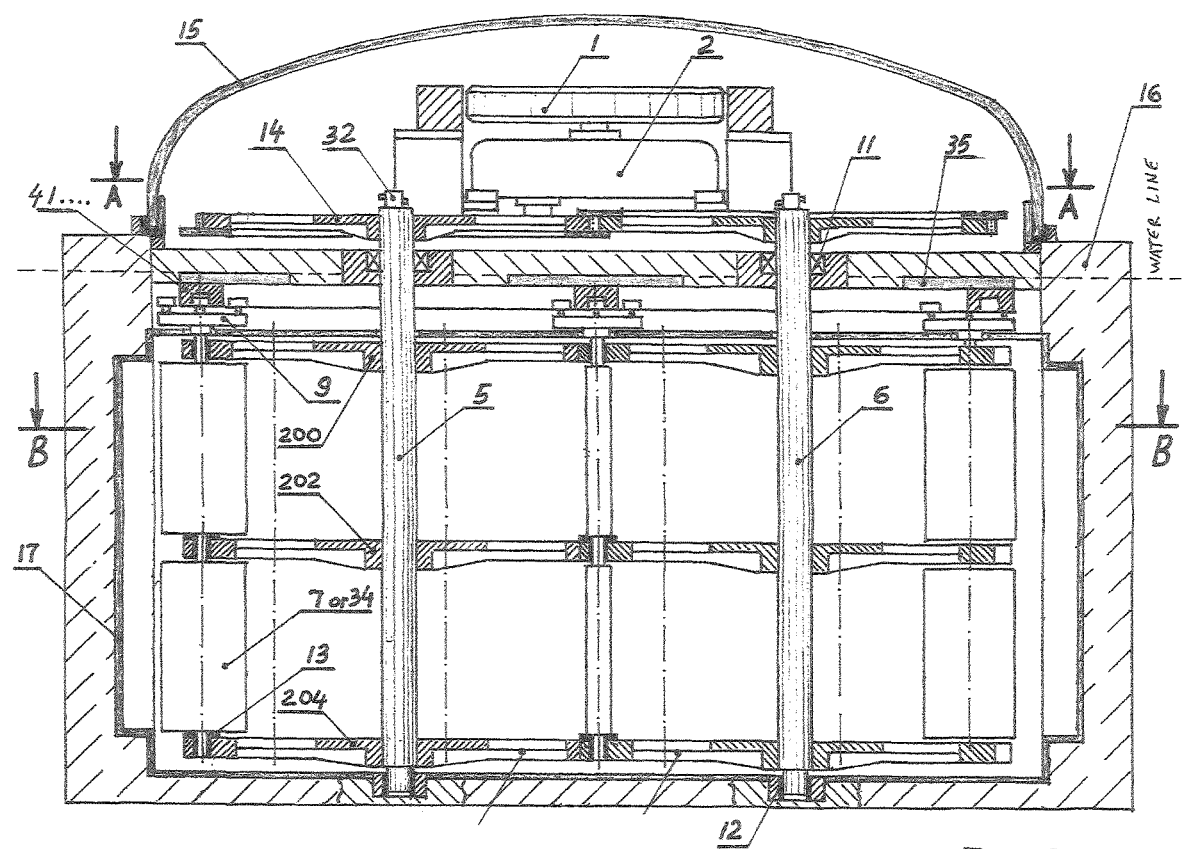
FIG. 2 is an elevation view of the hydrokinetic power unit assembly of FIG. 1, in accordance with one of the embodiments of the present invention. The view is a cross-section taken through plane C-C in FIG. 1, which, in turn, is a cross section through plane B-B of FIG. 2.

FIG. 2 is an elevation view of the hydrokinetic power unit assembly of FIG. 1, in accordance with one of the embodiments of the present invention. The view is a cross-section taken through plane C-C in FIG. 1. Shaft mount gear box 2 and electrical power generator 1 are installed above the waterline on top of the floating supporting barge structure 16. In some embodiments, the top of the power plant is covered with a spherical dished hood 15 of a material such as steel or aluminum for protecting the electrical and mechanical components of the power plant, such as the electric generator, control panel and mechanical driving system for the turbine and generator. The hood 15 can be easily removed for maintenance. If the power plant is used in a deep water environment, for example, in the ocean, it can be submerged under water and a spherical dome can be used to cover the power plant. This design would create low drag on the supporting structure and improve plant vertical stability because the dome can create a center of buoyancy above the plant center of gravity.

In FIG. 2, it can be seen that main vertical shafts 5 and 6 are supported by vertical thrust bearing 11 located on top of the platform and bottom plain bearing 12. Spur gears 14 are attached to the main shafts 5 and 6, respectively, and maintain the twin turbine wheels 3 and 4 in synchronized rotation. In FIG. 2, a representative vanes 7, is shown as part of an assembly including a vane shaft and a flange sleeve vane-rotating bearing 13, which can be attached from the outside to the turbine wheel 3 for ease of installation and maintenance. Hydraulic oil rotating joints 32 are attached on top of the main shafts 5 and 6 to supply oil or other lubricants to drive vanes hydraulic gear motors 30 when the power plant is started or stopped.

The vanes 7 are mounted to top vane mount 200, middle vane mount 202, and bottom vane mount 204. In various embodiments, the vanes 7 are at least three in number, and, in further related embodiments, are five or seven in number. The vane mounts are coupled to a main shaft 5, forming an assembly that is mounted for rotation about a central axis defined by the main shaft 5. When oriented transversely to the direction of the water current, a vane 7 is in a driving mode and powers rotation of the assembly, thereby transforming the kinetic energy of the flowing water into mechanical energy that may be used to power an electrical power generator. Conversely, when oriented parallel to the direction of the water current, the vane 7 is in a driven mode. To maintain the flow as laminar as possible, the systems for rotating, driving, and steering the vanes are located outside the water flow path. To effect changes in vane angle orientation, each vane 7 is associated with a guide wheel 9. FIG. 2 shows a guide wheel 9 mounted on top of a corresponding vane 7, although other configurations where the guide wheels 9 are attached to other positions, such as the bottom of the vanes 7, are also contemplated.

Figure 4:
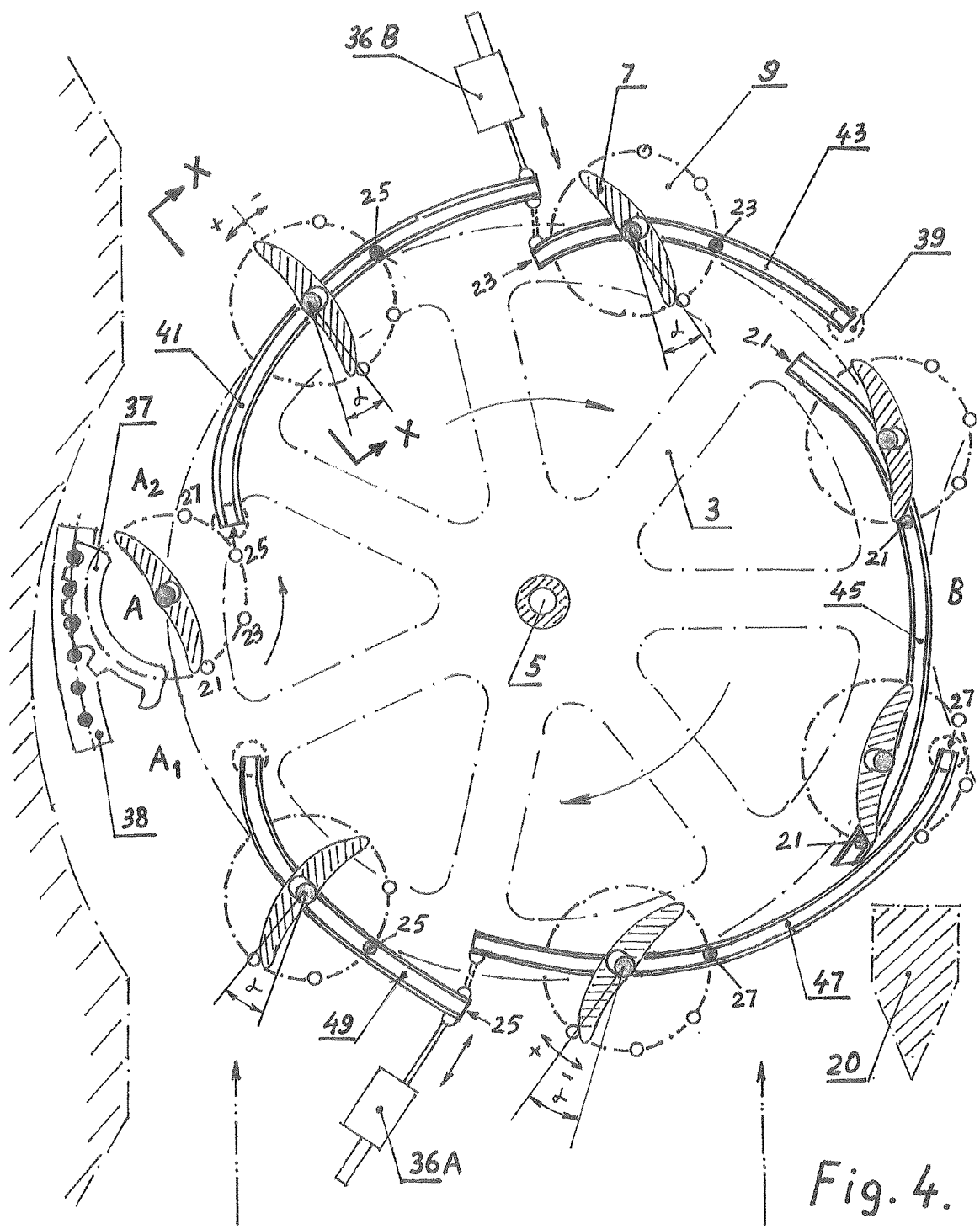
FIG. 4 is a plan view of a set of cam ring segments forming cam curved grooves, in accordance with an embodiment of the present invention, for use in the embodiment of FIG. 1.

As shown in FIG. 4, the orientation of each vane 7 is adjusted over the course of rotation of the main shaft so as to make the torque exerted by the vane 7 operative in a clockwise direction in turbine 3 and in a counterclockwise direction in turbine 4, respectively. When the orientation of the assembly places the vane 7 in a location upstream of main shaft 5 with respect to the direction of water flow, the angle of attack α between the direction of the current and the vane is such that the torque exerted by the vane 7 on the main vertical shaft 5 is directed in the clockwise direction. When the vane 7 is in a position downstream of the main shaft 5, the current direction and the vane still form an angle α, but the working face of the vane 7 has changed so that the resulting torque is still in the clockwise direction. Specifically, it can be seen in FIG. 4, that, for a vane having a corresponding cam roller located in the groove of cam segment 49 (located at about the 8 o'clock position around shaft 5, the face of the vane on its working side aims to the right, whereas, for a vane having a corresponding cam roller located in the groove of cam segment 41 (located at about the 11 o'clock position around shaft 5, the face of the vane on its working side aims to the left.

FIG. 4 is a plan view of a discontinuous cam vane steering system featuring cam segments 41, 43, 45, 47, and 49 having curved cam grooves, in accordance with an embodiment of the present invention, for use in the embodiment of FIG. 1. This system provides a vane angle control mechanism, configured to control angle of the vanes relative to the direction of current to provide an angle of attack, relative to the direction of the current, that is cyclically adjusted over the course of rotation of a main shaft of the turbine. Specifically, the system operates so that a given vane is oriented:

(i) substantially transversely to the direction of the current in a first rotational segment of the main shaft when the vane is in a drive mode, to power rotation of the turbine, and (ii) substantially parallel to the direction of the current in a second rotational segment of the main shaft when the vane is in a driven mode to return the given vane to a rotational position at a beginning of the first angular rotational segment.

The cam segments 41, 43, 45, 47, and 49 are attached to the plate support 35 (shown in FIG. 2) that is located above top vane mount 200. (Also contemplated are configurations where a plate support is located below the lower vane mount 204.) In FIG. 4, it can be seen that each wheel 9 associated with any given vane has a set of cam follower rollers 21, 23, 25, and 27, which are configured to be engaged with and move along successive grooves in cam segments 41, 43, 45, 47, and 49 to ensure that the vanes are in a position and at an angle appropriate to such vane at each rotational position of the turbine 3 or 4 in which such vane is mounted.

In other words, besides adjusting the vane angle according to whether the vane is in the drive mode or in the driven mode, the vane steering system also adjusts the vane angle in the course of the drive mode. At the beginning of the drive mode for any given vane, the given vane has a cam follower roller in the groove of cam segment 47. (It will be seen that in the preceding segment 45, the vane is in the driven mode so as to be substantially parallel to the current direction.) At the beginning of the drive mode, the current impinges directly on the vane, so the vane gets the full benefit of the current. The vane similarly gets the full benefit of the current at the end of the drive mode, when the given vane has a cam follower roller in the groove of cam segment 43. However, when the vane is half-way through the drive mode, with the cam follower roller entering the groove of cam segment 41, the rotation of the turbine causes the vane to experience a component of motion that is in the same direction as the current. Thus as the turbine shaft moves over an angle θ ranging 0 degrees from the beginning of the drive mode to 180 degrees at the end of the drive mode, the diminution of the current caused by the angular velocity of the shaft will be proportional to sin 0. To compensate for the sinusoidal diminution of the current over the drive mode, the angle of attack α is also adjusted over the drive mode by appropriate configuration of the cam segments 41, 43, 47, and 49. Indeed, the extent of sinusoidal adjustment required can also depend on the size of the current, and thus the rotational speed of the main shaft. Accordingly, as an additional feature of this embodiment of the present invention, the positions of cam segments 41, 43, 47, and 49 are adjusted by hydraulic linear actuators 36A and 36B, to further adjust the orientation of each vane when in a driving mode to optimize the angle of attack α of the water flow on the vane, so as to achieve maximum turbine torque output. In contrast to the movable positions of cam segments 41, 43, 47, and 49, cam segment 45 is stationary, because each vane is in the driven mode, rather than drive mode, when its cam roller is in the groove of cam segment 45. The ability to adjust cyclically the angle of attack of each vane when in the driving mode makes a power plant featuring a cam vane steering system have a much higher efficiency than a set or turbine vanes driven by a continuous system of the prior art. In a prior art continuous system, the vanes are always in the same orientation relative to water flow and it is impossible to adjust the angle of the vanes to optimize power transfer.

As vane 7 commences traveling along rotational segment 47, clockwise rotation of the assembly causes roller 21 to disengage from the groove of preceding cam segment 45 and roller 27 to engage in the groove of cam segment 47, to orient the vane 7 at an angle transverse to the direction of the current. As rotation of the assembly progresses further, roller 27 disengages from the groove of cam segment 47 and roller 25 engages the groove of cam segment 49, which sets guide wheel 9 at an orientation whereby vane 7 is maintained at the angle α.

Also as illustrated in FIG. 4, in the course of rotation of turbine wheel 3, any given vane 7 at region A must itself rotate about its longitudinal axis by an angle of about 90° within a relatively short extent of rotation by turbine wheel 3 so that the given vane 7 changes the working side in contact with the water flow. To this end, when a vane 7 reaches location A₁, sprocket segment 37 engages with stationary roller rack 38, causing guide wheel 9 to rotate along its longitudinal axis and reorienting the vane by the time it reaches location A₂. This rotation also causes follower roller 25 to engage groove 41 and set guide wheel 9 to an orientation whereby vane 7 is now still oriented at an angle of attack α to the direction of water flow. When the vane 7 reaches the end of the groove in cam segment 41, roller 23 engages the groove in cam segment 43 while roller 25 disengages from the groove in cam segment 41.

Still referring to FIG. 4, as the assembly further rotates in a clockwise direction, roller 23 disengages from the groove in segment 43 while roller 21 engages the groove in segment 45, which defines an angular segment of the assembly over which the vane is moving against the flow of the water, and the vane is therefore in the driven mode. In fact, as the assembly rotates while roller 21 is engaged in the groove in segment 45, water flow switches from impinging on the left side of the vane (at the beginning of the segment 45) to impinging on the right side of the vane (at the end of the segment). The switch in side on which the water flow impinges on the vane cause a corresponding change in shape of the vane, because the vanes of FIG. 4 are constructed in the manner shown in further detail in FIG. 7 (which is described below). The effect of this vane construction, summarized briefly, is that a water current flow having a vector component that is normal to a first surface of the vane causes that first surface to assume a concave shape in relation to the vector component. Consequently, at the beginning of the segment 45, the left side of the vane is concave, whereas, at the end of segment 45, the right side of the vane is concave. Thus the shape of the vane has flipped from concave on the left to concave on the right, even though the vane's orientation relative to the direction of current flow is only a few degrees. However, over that few degrees of change, the flow has shifted from impinging on the left side of the vane to impinging on the right side of the vane. Eventually, the vane approaches the beginning of the first rotational segment 47 where it is again positioned in a driving mode.

In FIG. 4, the cam vane steering system described above constitutes one embodiment of a vane angle control mechanism in accordance with the present invention. In other embodiments of the present invention, the vane angle control mechanism is implemented using digital control. In one digital control embodiment, in place of each guide wheel 9 associated with a given vane 7 is a stepper motor, and the stepper motors are coupled to a controller housed under the spherical dished hood 15. A shaft encoder is mounted on at least one of the main shafts 5 and 6 is also coupled to the controller. The controller uses the position of the main shafts 5 and 6 in executing an application that operates the stepper motors to control vane orientation in the manner previously described in connection with the cam vane steering mechanism.

Figure 5A:
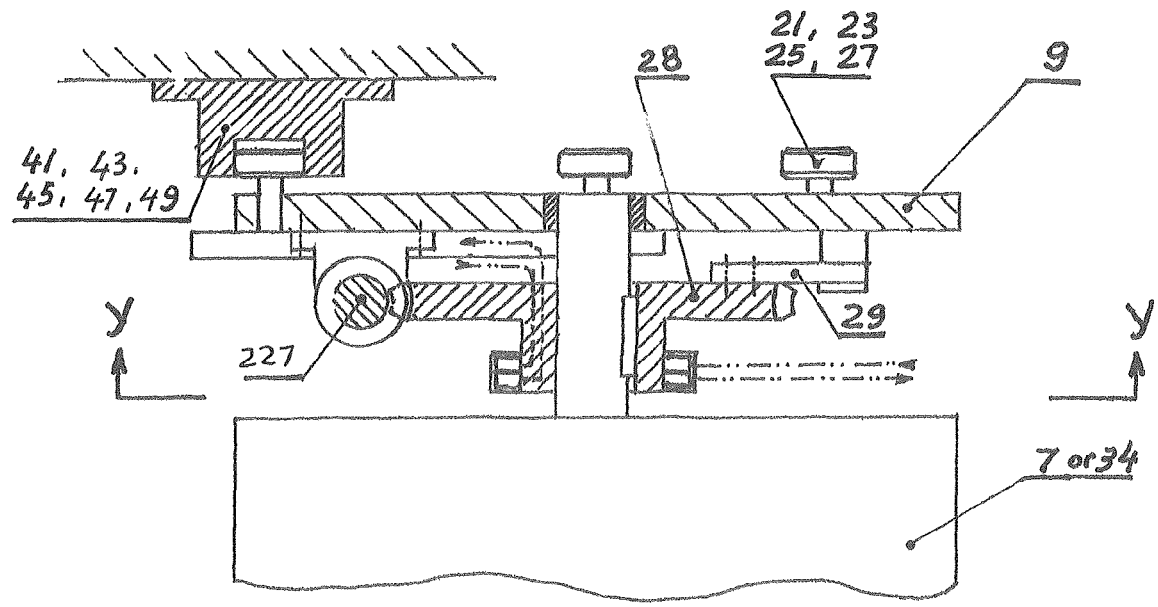
FIG. 5A is a vertical section of a vane guide wheel assembly taken through plane X-X of FIG. 4.
Figure 5B:
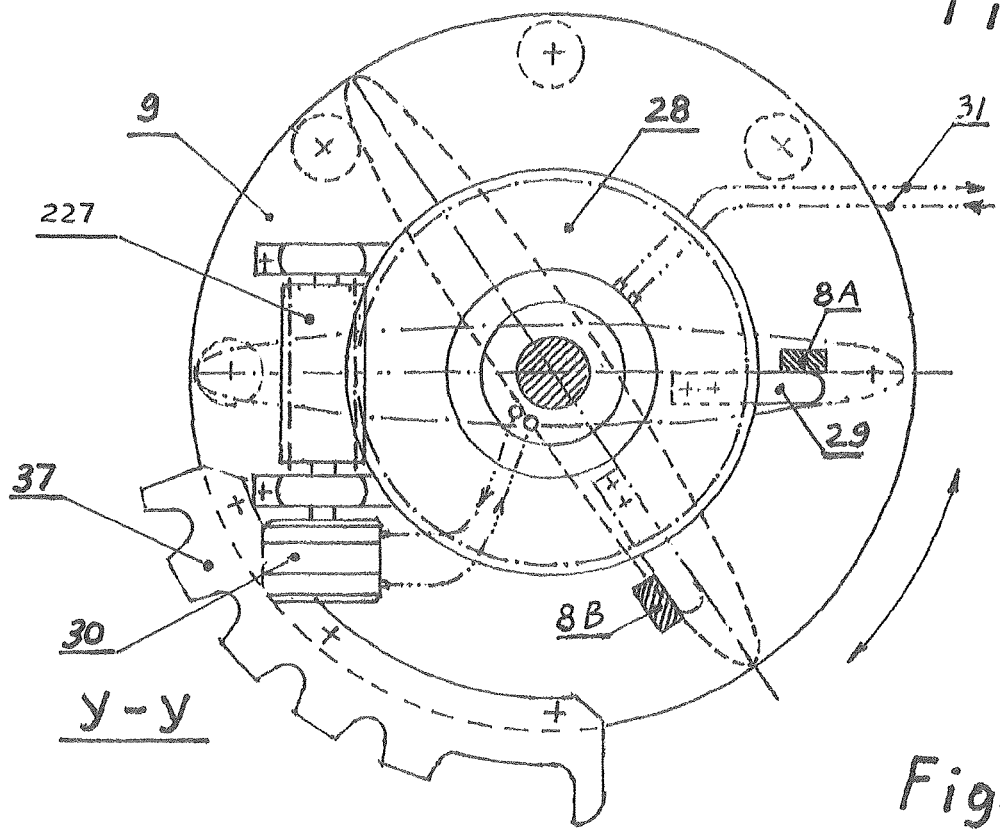
FIG. 5B is a plan view of detail taken through plane Y-Y of FIG. 5A.

FIG. 5A is a vertical section of a vane guide wheel assembly taken through plane X-X of FIG. 4, in accordance with an embodiment of the present invention, for use in the embodiment of FIG. 1. Each guide wheel 9 is preferably mounted so that the center of the guide wheel 9 coincides with the longitudinal axis of the corresponding vane, and a set of four cam follower rollers 21, 23, 25, and 27 are disposed on the upper surface of guide wheel 9 circumferentially over an angular extent of at least about 45 degrees (as shown in FIG. 5B. FIG. 5B is a plan view of detail in plane Y-Y of FIG. 5A where sprocket segment 37 attached to the outer rim of the guide wheel 9 is shown.

FIGS. 5A and 5B also illustrate an embodiment where special safety fixtures are fitted to each vane guide wheel 9. Worm gear 28 is attached to the shaft of vane 7 and worm 227 is driven by hydraulic gear motor 30 and attached to vane guide wheel 9. Stop lever 29 is connected to worm gear 28 and moves between two fix stopper positions 8A and 8B that are in turn attached to vane guide wheel 9. During normal operation each stop lever 29 is in position 8A.

Figure 3:
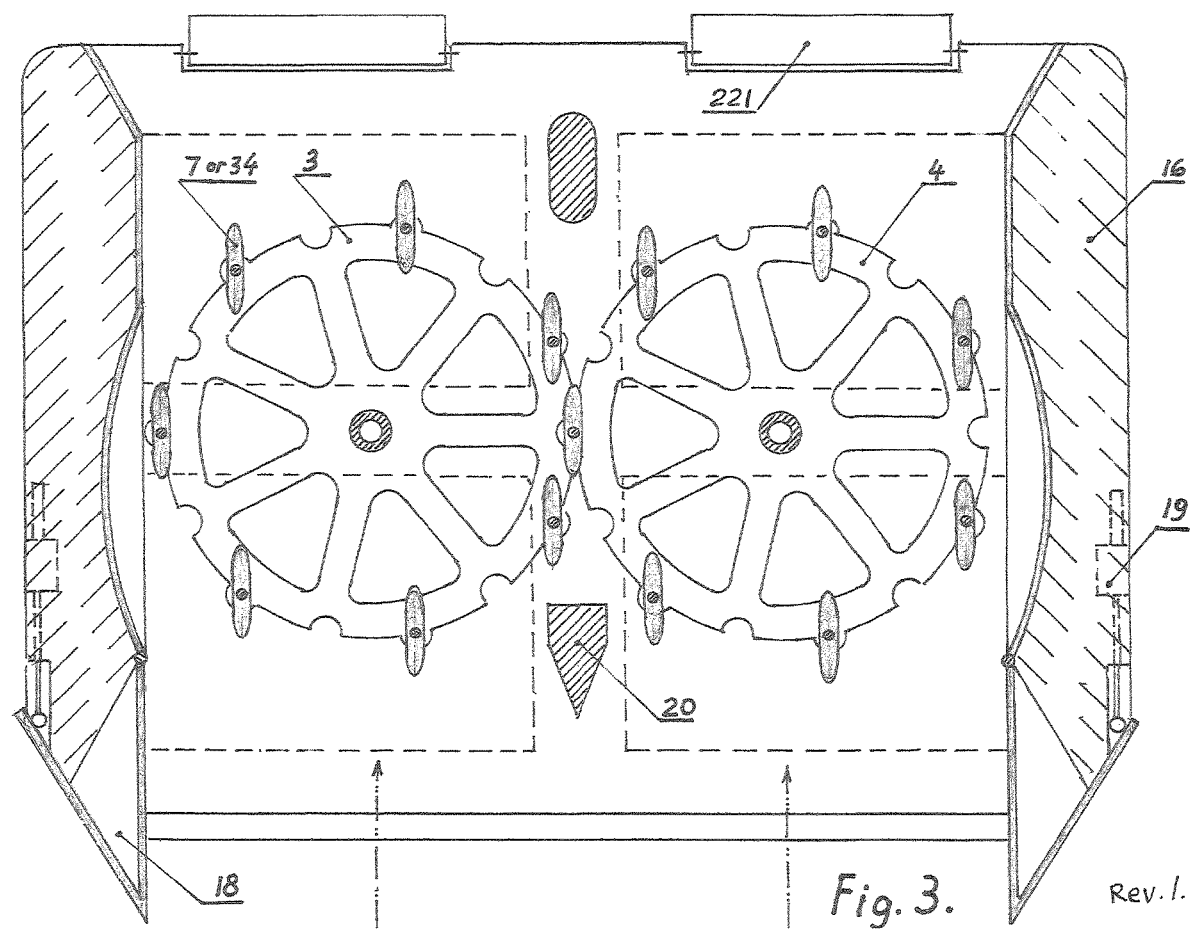
FIG. 3 is a layout of turbine wheel vanes and intake gate in the power plant of FIG. 1 in shutdown mode, in accordance with one of the embodiments of the present invention.
Figure 6:
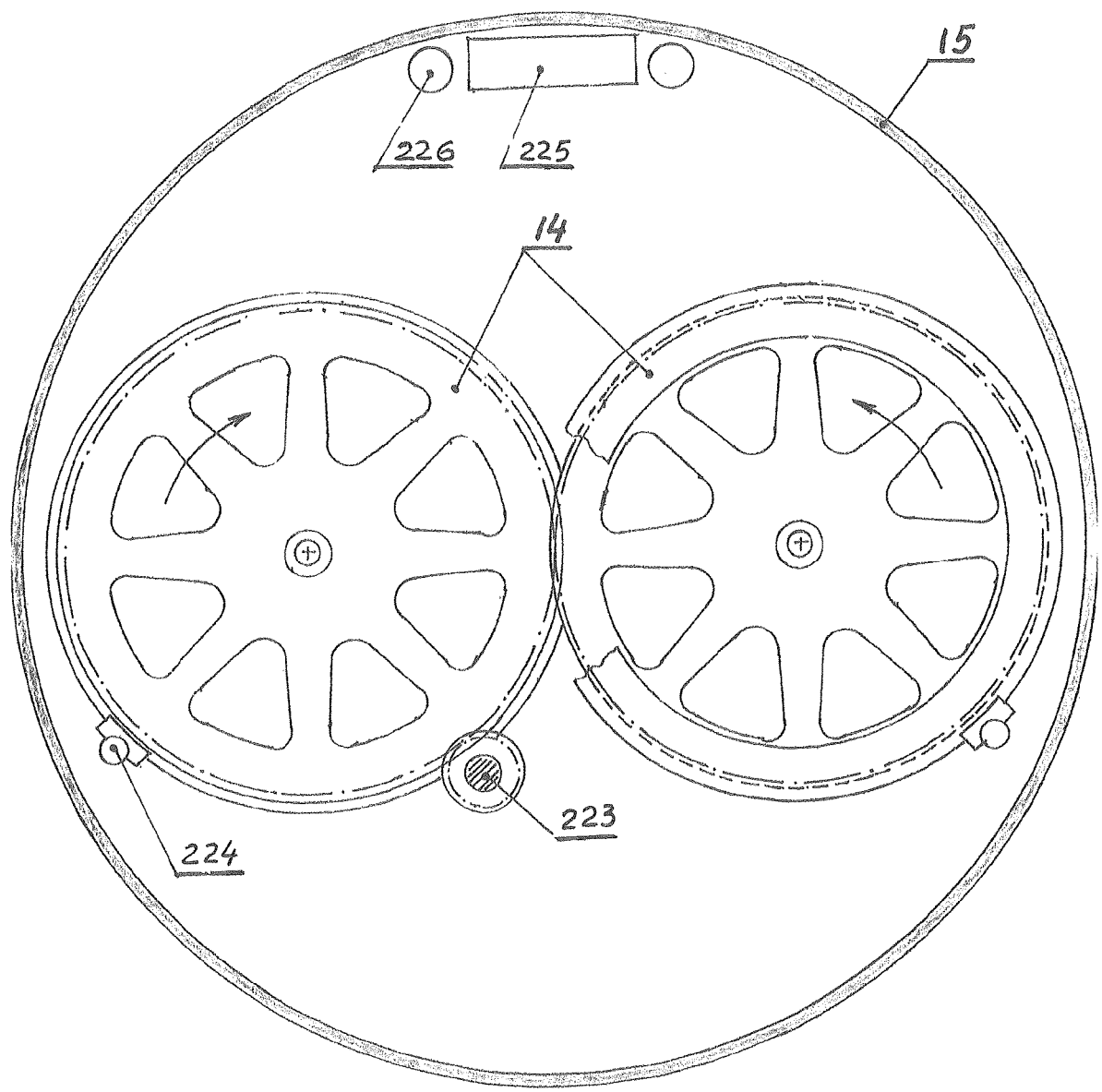
FIG. 6 is a plan view of a cross-section of the hydrokinetic power plant assembly of FIG. 1, in accordance with one of the embodiments of the invention. The view is taken through the plane A-A in FIG. 2.

As illustrated in FIG. 6, in an emergency or any instance where there arises a need for stopping the power plant, a sensor relays a signal to hydraulic control panel 225 (part 226 is a hydraulic accumulator) and hydraulic disk brake 224 stops the turbine from rotating in a desired position. At the same time, and as shown in FIG. 5, hydraulic gear motor 30 (connected to hydraulic oil tubing 31 and to hydraulic oil rotating joint 32) will turn stop lever 29 from position 8A to position 8B, placing the vane in an orientation parallel to the direction of the water current, as depicted in FIG. 3, which is a layout of turbine wheel vanes and intake gate in the power plant of FIG. 1 in shutdown mode. When gate 18 is in the closed position, water flow through the turbine is reduced and, with all vanes in an orientation parallel to the water flow, the water pressure-induced stress on the vanes and the power plant supporting structure is also reduced.

In traditional turbines the gear box is the heaviest component and most mechanically complex component. Usually, more than one hundred mechanical components engage with one another to multiply the low rotation velocity of the turbine to the higher speed ratio of 1:50 that is required for the generation of electricity. Therefore, the gear box parts are apt to be the most vulnerable to potential breaks. FIG. 6 is a plan view of a cross-section of the hydrokinetic power plant assembly of FIG. 1, taken through the plane A-A in FIG. 2, according to an embodiment of the present invention. The driver input gear shaft 223 already engages with spur gears 14 and multiplies the main vertical shaft rotation speed by about 6 to 8 times more than the rotation of the main turbine shaft. This allows input gear shaft 223 to drive a low speed generator without a gear box or with a simple gear box having a maximum of ratio 1:5. Hydraulic control panel 225 is configured to control power plant operation through a processing unit that is programmed for this purpose. The processor ensures that the power plant operates at the maximum torque output at all times and in varying working conditions. Also, in case of an emergency, hydraulic linear actuator 19 can move gate 18 to a closed position to reduce water flow through the turbines and safety fixtures such as those of FIG. 5 turn the vanes into an orientation parallel to the water flow.

Figure 7A:
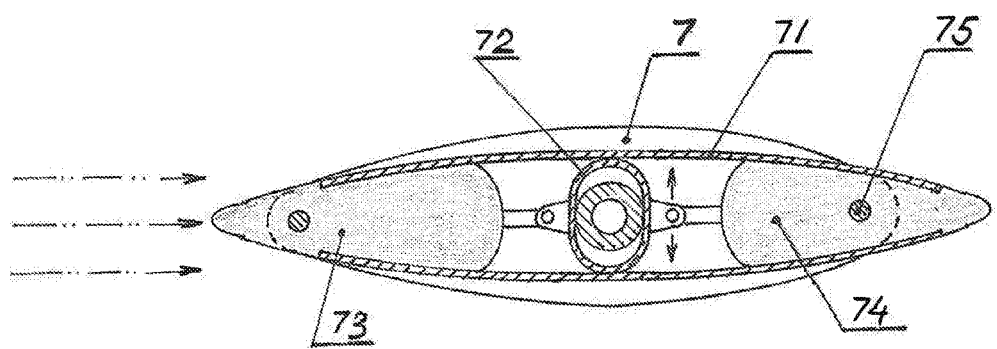
FIGS. 7A and 7B are cross-sections of a first embodiment of a vane, in accordance with the present invention, for use with the hydrokinetic power plant assembly of FIG. 1, in which the vane is configured to deform from a neutral shape (in FIG. 7A), in the presence of flow that is parallel to the vane, into a lift-generating shape (in FIG. 7B), in the presence of flow that is at an angle α transverse to the vane.
Figure 7B:
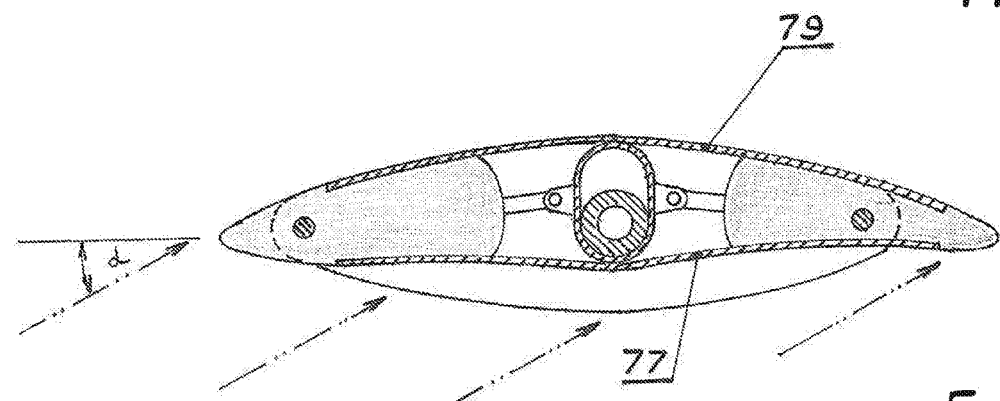

In a further aspect, the present invention provides novel types of vanes. FIG. 8C is a cross-section of a conventional, prior art vane featuring essentially convex surfaces on both faces, resulting in a relatively low efficiency. FIGS. 7A and 7B are cross-sections of a novel vane 7, in accordance with an embodiment of the present invention, for use with the hydrokinetic power plant assembly of FIG. 1. The vane 7 is configured to deform from a neutral shape (as illustrated in FIG. 7A), in the presence of flow that is parallel to the vane, into a pressure and lift-generating shape (as illustrated in FIG. 7B), in the presence of flow having an angle of attack α transverse to the vane, creating pressure on flexible vane wall 77. Sliding wall connector 72 links front wall support 73 and tail wall support 74 through pivot point 75. Wall supports 73 and 74 are flexible and change shape depending on the angle α. As a result, the pressure creates a concave surface on vane wall 77 and pushes sliding wall connector 72 upwards, bending flexible wall surface 71 into convex surface 79. Thus, a hydrodynamic lift force (low-pressure) is created when the water flows along the vane at sufficient velocity. If the water flow is parallel to the vane, it will form convex surfaces on both sides, as illustrated in FIG. 7A, resulting in a neutral shape that minimizes drag. Without being bound to any particular theory, it is believed that shape-changing vanes as that of FIG. 7B operate more efficiently at water current speeds of about 3.0 m/sec (6.75 MPH) and higher by using the concave surface 77 for harnessing water pressure and the convex surface 79 for generating lower pressure or lift. Therefore, at higher water current speeds both vane surfaces simultaneously convert hydrokinetic energy to mechanical work.

Figure 8A:
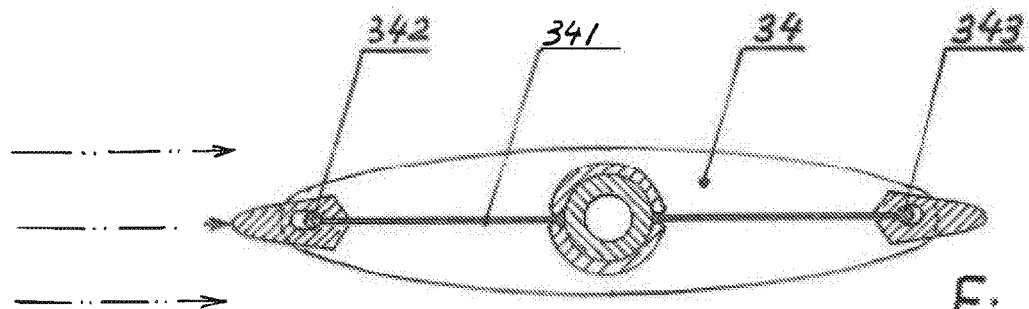
FIGS. 8A and 8B are cross-sections of a second embodiment of a vane, in accordance with the present invention, for use with the hydrokinetic power plant assembly of FIG. 1, in which the vane is configured to deform from a neutral shape (in FIG. 8A), in the presence of flow that is parallel to the vane, into a shape forming two concavities (in FIG. 8B), in the presence of flow that is at an angle β transverse to the vane.
Figure 8B:
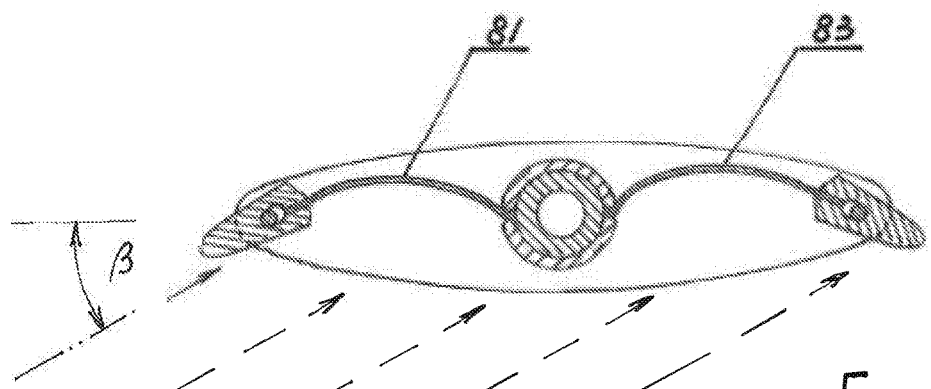
Figure 8C:
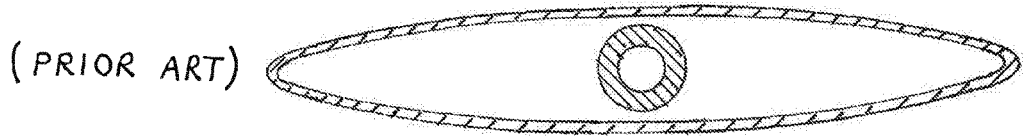
FIG. 8C is a cross-section of a conventional, prior art vane.

FIGS. 8A and 8B are cross-sections of a vane 34 according to another embodiment of the invention that is optimized for maximum performance at lower water current velocities of approximately 1.0 to 2.5 m/sec (2.25 to 5.62 MPH). Vane 34 features a single flexible wall 341 that is attached to two pivot points 342 and 343. The vane is configured to deform from a neutral shape (in FIG. 8A) in the presence of flow that is parallel to the vane into a shape featuring two concavities 81 and 83 (in FIG. 8B) in the presence of flow with an angle of attack β transverse to the vane. This plurality of concavities is optimized to operate only or mostly by the action of water pressure, and the angle of attack β is preferably greater than in the instance of lift-generating vanes.

Preliminary Performance Evaluation

Graphical vector representation for force, velocity and moment are used for the preliminary performance evaluation of an example power plant. Turbine wheels and vanes are sized to be able to deliver approximately 750 to 1,000 KW per power plant at a speed of water flow between 1.5 and 3.5 m/sec (3.4 to 7.8 MPH). The turbine assembly includes seven rotating vanes on each turbine wheel in the shape of a circle with an approximate diameter of 3.6 m (12 ft). The turbine wheel is made of two sections each approximately 2.4 m (8 ft) in height, making the total height of the turbine wheel about 4.8 m (16 ft). Each vane's is approximately 0.8 m wide and 2.4 m high (W 2.6 ft×H 8.0 ft). The water intake duct is 7.0 m wide and 5.0 m high (W 23.3 ft×H 16.6 ft).

If it is assumed that the power plant operates in a water stream with at a flow velocity V of about 2.5 m/sec then; the turbine wheels will rotate at about 8 RPM, the total flow rate through the turbines will be about 105 m³/sec (3700 ft³/sec), and the total amount of kinetic energy $K_e$ that passes through the power plant each second is equal to about:

$$K_e = \frac{1}{2} \times 105 \times V^2 = 4635 \text{ KW}$$

The power plant is able to convert approximately 600 KW into electricity. In other words, for every 1000 KW of $K_e$ making their way through the power plant approximately 150 KW will be converted into electricity.

In comparison, Verdant Power (New York, N.Y.) currently operates thirty underwater turbines with 3-blade propellers having a diameter of 5 m (16.5 ft) in New York City's East River. Each turbine is rated at 35 KW of power at a water current velocity of 2.5 m/sec (5.6 MPH). The total water flow through a Verdant Power turbine is about 45 m³/sec (1236 ft³/sec). Accordingly, the total $K_e$ passing through the each Verdant turbine is equal to:

$$K_e = \frac{1}{2} \times 45 \times V^2 = 1380 \text{ KW}$$

In other words, for 1000 KW of $K_e$ flowing through the Verdant Power turbine only 25 KW are converted into electricity. Hence, it is estimated that the example power plant can convert kinetic energy at about five times the efficiency attained with conventional water turbines.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A hydrokinetic turbine, operative in a water environment and driven by a water current, the turbine comprising:
   upper and lower vane mounts;
   a main shaft coupling the vane mounts to form an assembly and defining a central axis; the assembly being mounted for rotation about the central axis, the main shaft providing a rotational output;
   a set of at least three vanes, each vane having a longitudinal axis and mounted between the upper and lower vane mounts for reciprocating rotation about its respective longitudinal axis, each of the vanes having a drive mode when, in the course of rotation of the main shaft, in a first rotational segment, water current causes such vane to drive the main shaft and, in a second rotational segment, water current causes such vane to be driven by the main shaft;
   a vane angle control mechanism, configured to control angle of the vanes relative to the direction of current so as to provide an angle of attack, relative to the direction of the current, that is cyclically adjusted over the course of rotation of the shaft;
   wherein the vane angle control mechanism operates so that a given vane of the set of vanes is oriented:
   (i) substantially transversely to the direction of the current when the assembly's orientation causes the given vane of the set of vanes to be in a driving mode, to power rotation of the assembly over the first rotational segment of the assembly, wherein substantially transverse to the direction of the current is defined as having an orientation in which the direction of the current is less than 45 degrees of a normal to a face of the given vane on a working side of the vane, and
   (ii) substantially parallel to the direction of the current when the assembly's orientation causes the given vane of the set of vanes to be in a driven mode over the second rotational segment, to return the given vane of the set of vanes to a rotational position at a beginning of the first rotational segment, wherein substantially parallel to the direction of the current is defined as having an orientation in which the direction of the current is greater than 45 degrees of the normal to the face of the given vane on its working side,
   wherein the vane angle control mechanism includes:
   a set of control cam segments located along the first and second rotational segments mounted in a location selected from the group consisting of above the upper vane mount and below the lower vane mount, each cam segment forming a curved cam groove; and
   a set of guide wheels, each guide wheel associated with a distinct one of the vanes and mounted so that a center of the guide wheel coincides with the longitudinal axis of the corresponding vane, each guide wheel including a set of follower rollers disposed over a rotational extent of at least 45 degrees around such guide wheel and engageable with a corresponding one of the grooves, depending on an angular position of the assembly, wherein engagement of a given follower roller of the set of follower rollers of a given guide wheel of the set of guide wheels in a groove of a given cam segment of the set of cam segments establishes angular orientation of the corresponding vane over the duration of such engagement.

2. A turbine according to claim 1, wherein the vane angle control mechanism further operates so that the angle of attack is adjusted to compensate for current velocity changes experienced by the given vane of the set of vanes over the course of the driving mode.

3. A turbine according to claim 2, wherein each vane comprises a double-flexible wall assembly, having opposed faces and configured to form a concave surface on a working face that is first impinged by the water current and a convex surface on the opposed face, so as to generate a hydrodynamic lift.

4. A turbine according to claim 1, wherein each vane is of resilient material having a surface configured to be deflected, by water current in a direction that is transverse to the vane, into a shape that provides hydrodynamic lift in the presence of such current.

5. A turbine according to claim 1, wherein each vane comprises a single flexible wall configured to form a surface having a plurality of concavities.

6. A turbine according to claim 1, wherein each of the cam segments of the set of cam segments, located along the first rotational segment, for controlling an angle of attack of a given vane of the set of vanes when it is in the driving mode, is movably mounted so as to provide further adjustment of the angle of attack of the given vane.

7. A turbine according to claim 6, wherein each cam segment of the set of cam segments located along the first rotational segment is mounted for motion about its own pivot point.

8. A turbine according to claim 7, further comprising a set of linear actuators, coupled to the movably mounted cam segments, and configured to move each cam segment of the set of cam segments about its own pivot point.

9. A turbine according to claim 1, wherein one of the grooves is configured to render the orientation of a given vane from the set of vanes substantially parallel to the direction of the current over the second rotational segment.

10. A turbine according to claim 1, further comprising a vane rotator configured to change the orientation of a vane of the set of vanes from a first angle of attack of the water flow on the vane to a second angle of attack of the water flow on the vane, wherein each guide wheel includes a sprocket segment and the vane rotator is a roller rack configured to engage the sprocket segment and change the orientation of the vane from the first angle of attack to the second angle of attack.

11. A turbine according to claim 10, wherein the vane rotator is configured to preserve the direction of the torque generated by the vane about the central axis.

12. A hydrokinetic turbine system comprising a pair of turbines, each turbine being constructed according to the turbine of claim 1, wherein the pair of turbines are mechanically coupled so as to engage in synchronized counter rotation.

13. A turbine system according to claim 12, further comprising a water current splitter disposed between the turbines, wherein the current splitter is a V-shaped column.

14. A turbine according to claim 1, further comprising an adjustable water intake.

15. A turbine according to claim 14, wherein the adjustable water intake is a gate configured to reduce or stop the water current in the event of an emergency.

16. A turbine according to claim 1, further comprising a security device configured to orient all vanes parallel to the direction of the current.

* * * * *